United States Patent
Wong

(10) Patent No.: US 11,664,710 B2
(45) Date of Patent: May 30, 2023

(54) VARIABLE-SPEED CONTROL ASSEMBLY FOR AN ELECTRIC DEVICE

(71) Applicants: Defond Electech Co., Ltd, Dongguan (CN); Defond Components Limited, Hong Kong (HK)

(72) Inventor: Wai Man Wong, Hong Kong (HK)

(73) Assignees: DEFOND COMPONENTS LIMITED, Hong Kong (CN); DEFOND ELECTECH CO., LTD, Guangdong (CN)

( * ) Notice: Subject to any disclaimer, the term of this patent is extended or adjusted under 35 U.S.C. 154(b) by 104 days.

(21) Appl. No.: 17/070,767

(22) Filed: Oct. 14, 2020

(65) Prior Publication Data
US 2021/0111611 A1   Apr. 15, 2021

(30) Foreign Application Priority Data

Oct. 15, 2019   (HK) .................................. 19130971.5

(51) Int. Cl.
*H02K 11/33*   (2016.01)
*H02K 7/14*   (2006.01)
*H02K 5/04*   (2006.01)

(52) U.S. Cl.
CPC .............. *H02K 11/33* (2016.01); *H02K 5/04* (2013.01); *H02K 7/14* (2013.01); *H02K 7/145* (2013.01)

(58) Field of Classification Search
CPC ........ H01H 9/061; H01H 1/44; H01H 15/005; H02K 11/33; H02K 5/04; H02K 7/145;
(Continued)

(56) References Cited

U.S. PATENT DOCUMENTS 6,275,138 B1 *   8/2001   Maeda ................. H01C 10/106
338/47
10,027,206 B2   7/2018   Woodward
(Continued)

FOREIGN PATENT DOCUMENTS

CN   101677225 A   3/2010

*Primary Examiner* — Alexander A Singh
(74) *Attorney, Agent, or Firm* — Seed Intellectual Property Law Group LLP

(57) ABSTRACT

A variable-speed control assembly for use in controlling speed of an electric motor of an electric device, the variable-speed control assembly including: a housing; a speed signaling circuit module located within the housing including a pair of spaced-apart electrically-conductive stationary contact members and a movable electrically-conductive contact member configured for movement relative to the pair of stationary contact members between at least one of an OFF position in which the movable contact member does not electrically connect the pair of stationary contact members, and, a plurality of ON positions in which the movable contact member electrically connects the pair of stationary contact members such that an electric current supplied to the speed signaling circuit module from a power supply of the electric device is able to flow between the pair of stationary contact members via the movable contact member; wherein the movable contact member includes an elastically-deformable material configured for deforming in to a plurality of different deformed configurations when arranged in each of the plurality of ON positions such that a contact area between the movable contact member and the pair of stationary contact members will vary in each of the plurality of ON positions resulting in an amount of electrical resistance across the movable contact member varying when arranged in each of the plurality of ON positions relative to the pair of stationary contact members; and whereby said speed signaling circuit module is configured for producing (Continued)

different output electrical signals configured for use in controlling speed of operation of the electric motor by reference to the variable electrical resistance across the movable contact member when arranged in each of the ON positions.

11 Claims, 2 Drawing Sheets

(58) Field of Classification Search
CPC ........ H02K 7/14; H02K 7/00; H02K 11/0094; H02K 11/30; B25F 5/001
USPC ..................................................... 310/47, 50
See application file for complete search history.

(56) References Cited

U.S. PATENT DOCUMENTS

| | | | |
|---|---|---|---|
| 2003/0141765 A1* | 7/2003 | Chu ........................ | H01C 10/12 338/215 |
| 2016/0111943 A1 | 4/2016 | Woodward | |
| 2017/0271964 A1 | 9/2017 | Woodward | |
| 2019/0143501 A1* | 5/2019 | Wong ........................ | H02P 6/30 173/5 |

* cited by examiner

VARIABLE-SPEED CONTROL ASSEMBLY FOR AN ELECTRIC DEVICE

TECHNICAL FIELD

The present invention relates to variable-speed control assemblies for controlling the speed of operation of electric devices or appliances such as electric power tools, electric gardening tools and the like.

BACKGROUND OF THE INVENTION

Certain electric devices and appliances such as power tools will include an electric motor and a variable speed control assembly comprising for instance a variable speed trigger assembly that is able to be actuated by a user's finger in order to control the speed of the electric motor. When the control assembly is operated, an actuator shaft may be displaced and the extent of the displacement may be sensed and processed by speed-signaling circuitry as the basis for variably controlling the speed of the motor. In certain existing control assemblies, the actuator shaft may typically be required to move in a range of distances of around 4 mm-10 mm and will be operably connected with a biasing element such as a return spring which urges the actuator shaft into a default OFF position. Unfortunately, one problem associated with such existing control assemblies is that certain users may lack sufficient finger strength in order to apply and/or sustain the required amount of force to the actuator to effect operation of the electric motor. Another problem associated with certain existing control assemblies such as those comprising a trigger assembly is that they tend to utilise numerous interconnected moving mechanical parts which increases susceptibility to wear and incurs higher maintenance and repair costs over time. Furthermore, as the power capability of electric power tools is ever increasing, there is a perceived need to try and reduce the overall size and weight of such power tools to compensate for the inclusion of increasingly larger and heavier capacity electric motors, heat dissipation devices and high-load capacity wiring within the housing.

SUMMARY OF THE INVENTION

The present invention seeks to alleviate at least one of the above-described problems.

The present invention may involve several broad forms. Embodiments of the present invention may include one or any combination of the different broad forms herein described.

In one broad form, the present invention provides a variable-speed control assembly for use in controlling speed of an electric motor of an electric device, the variable-speed control assembly including:

a housing;

a speed signaling circuit module located within the housing including a pair of spaced-apart electrically-conductive stationary contact members and a movable electrically-conductive contact member configured for movement relative to the pair of stationary contact members between at least one of an OFF position in which the movable contact member does not electrically connect the pair of stationary contact members, and, a plurality of ON positions in which the movable contact member electrically connects the pair of stationary contact members such that an electric current supplied to the speed signaling circuit module from a power supply of the electric device is able to flow between the pair of stationary contact members via the movable contact member;

wherein the movable contact member includes an elastically-deformable material configured for deforming in to a plurality of different deformed configurations when arranged in each of the plurality of ON positions such that a contact area between the movable contact member and the pair of stationary contact members will vary in each of the plurality of ON positions resulting in an amount of electrical resistance across the movable contact member varying when arranged in each of the plurality of ON positions relative to the pair of stationary contact members;

and whereby said speed signaling circuit module is configured for producing different output electrical signals configured for use in controlling speed of operation of the electric motor by reference to the variable electrical resistance across the movable contact member when arranged in each of the ON positions.

Preferably, the speed signaling circuit module may include a printed circuit board and said pair of stationary contact members may be integrally formed in the printed circuit board.

Preferably, at least one of the stationary contact members may include at least one of a conductive pad and a conductive wire disposed on a surface of the speed signaling circuit module.

Preferably, at least one of the pair of stationary contacts may include a carbon film.

Preferably, the conductive wire may include a silver nano wire.

Preferably, the elastically-deformable material of the movable contact member may include at least one of a conductive silicone material and a conductive foam material.

Preferably, the elastically-deformable material of the movable contact member may be configured to compress within a range of approximately 1 mm as the movable contact member is movably arranged amongst the plurality of ON positions relative to the pair of stationary contact members.

Preferably, the elastically-deformable material of the movable contact member may be configured for arrangement at a maximum distance of approximately 2 mm from the pair of stationary contact members when arranged in the OFF position.

Preferably, the speed signaling circuit module may include a capacitor and an integrated circuit configured for controlling the charging and discharging of the capacitor via the electrical resistance provided by the movable contact member and whereby said speed signaling circuit module may be configured for producing different output electrical signals configured for use in controlling speed of operation of the electric motor by reference to the charging and/or discharging time of the capacitor.

Preferably, the present invention may further include a trigger assembly having:

a trigger actuator configured for operable-interaction with a first switch circuit, wherein said trigger actuator is configured for movement along a trigger actuator movement axis relative to the housing between at least one of an OFF position in which it causes the first switch circuit to open and prevent flow of electrical current from a power supply to the electric motor via the first switch circuit, and, an ON position in which it causes the first switch circuit to close and enable flow of electrical current from the power supply to the electric motor via the first switch circuit; and wherein said movable contact member of the speed signaling circuit module is operably-connected with the trigger actuator and movable by the trigger actuator between the OFF position relative to the pair of stationary contact members when the trigger actuator is arranged in its OFF position, and the plurality of ON positions relative to the pair of stationary contact members when the trigger actuator is arranged in its ON position.

Preferably, the present invention may include a second switch circuit having at least one stationary contact member located within the housing and a movable contact member configured for movement relative to the at least one stationary contact member between ON and OFF operational positions, wherein when arranged in the OFF operational position the second switch circuit is configured to restrict electrical current from being supplied to the speed signaling circuit module from the power supply, and wherein, when arranged in the ON operational position the second switch circuit is configured to allow electrical current to flow to the speed signaling circuit module from the power supply, and whereby said second switch circuit is configured for being arranged in the OFF operational position when the trigger actuator is arranged in its OFF position.

Preferably, the movable contact member of the second switch circuit may include a conductive wiper rigidly-mounted on the trigger actuator.

BRIEF DESCRIPTION OF THE DRAWINGS

The present invention will become more fully understood from the following detailed description of a preferred but non-limiting embodiments thereof, described in connection with the accompanying drawings, wherein.

DETAILED DESCRIPTION OF THE PREFERRED EMBODIMENTS

Figure 1:
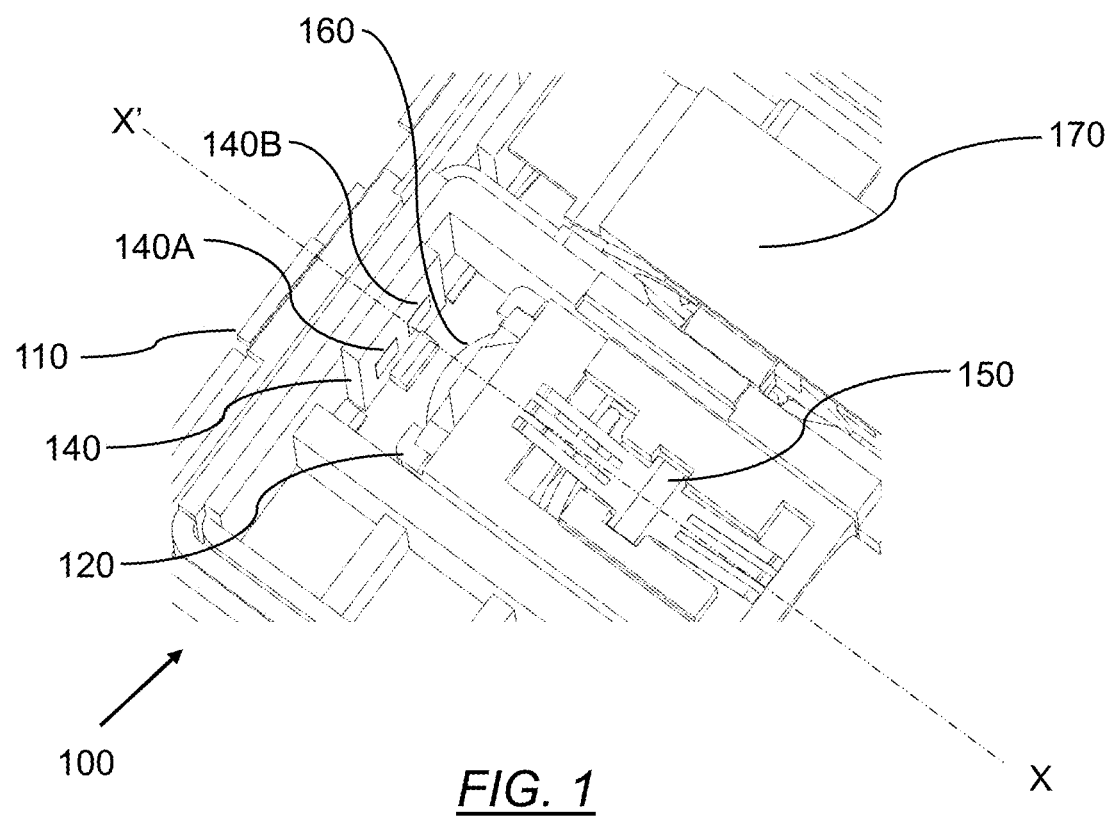
FIG. 1 shows a top cut-away view of a variable speed control assembly housing for use with an electric power tool in accordance with an embodiment of the present invention, wherein the trigger actuator is arranged in an OFF position and an elastically-deformable movable contact rigid mounted to an end of the trigger actuator does not electrically connect the pair of the stationary contact members of the PCB comprised by conductive carbon films.
Figure 2:
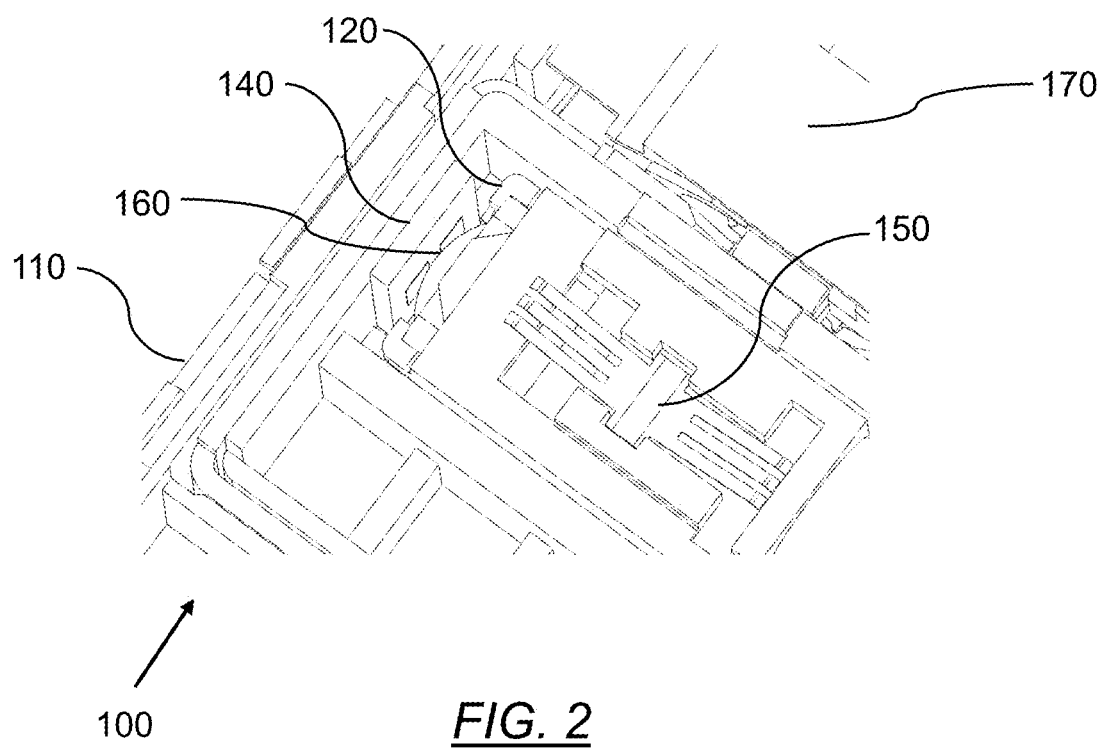
FIG. 2 shows another top cut-away view of the variable speed control assembly housing for use with an electric power tool in accordance with an embodiment of the present invention, wherein the trigger actuator is arranged in one of a plurality of ON positions in which the elastically-deformable movable contact mounted to the trigger actuator electrically connects the pair of the stationary contact members of the PCB comprised by conductive carbon films.
Figure 3:
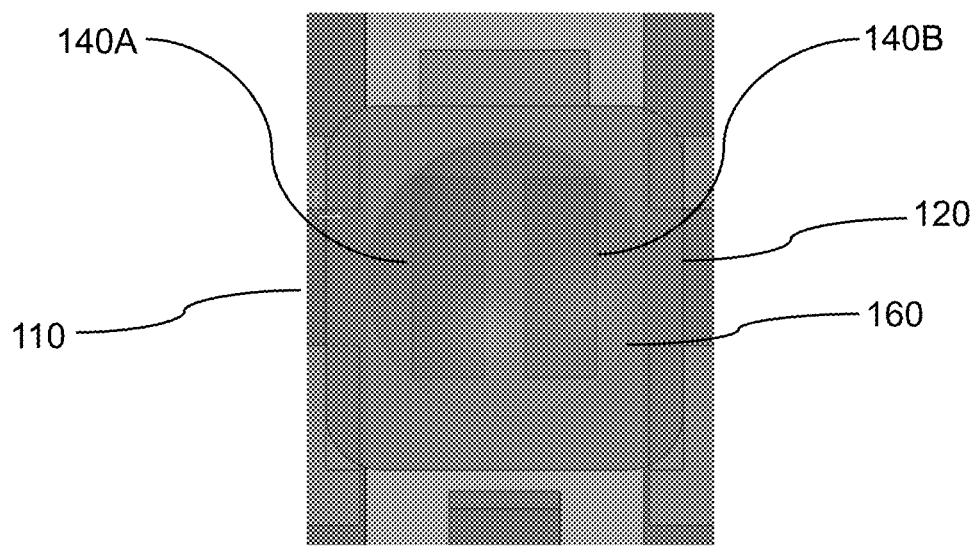
FIG. 3 shows a rear-end view along the movement axis of the trigger actuator with the elastically-deformable movable contact member being arranged in contact with the pair of stationary contact members comprised by conductive carbon films on the PCB in accordance with an embodiment of the present invention.
Figure 4:
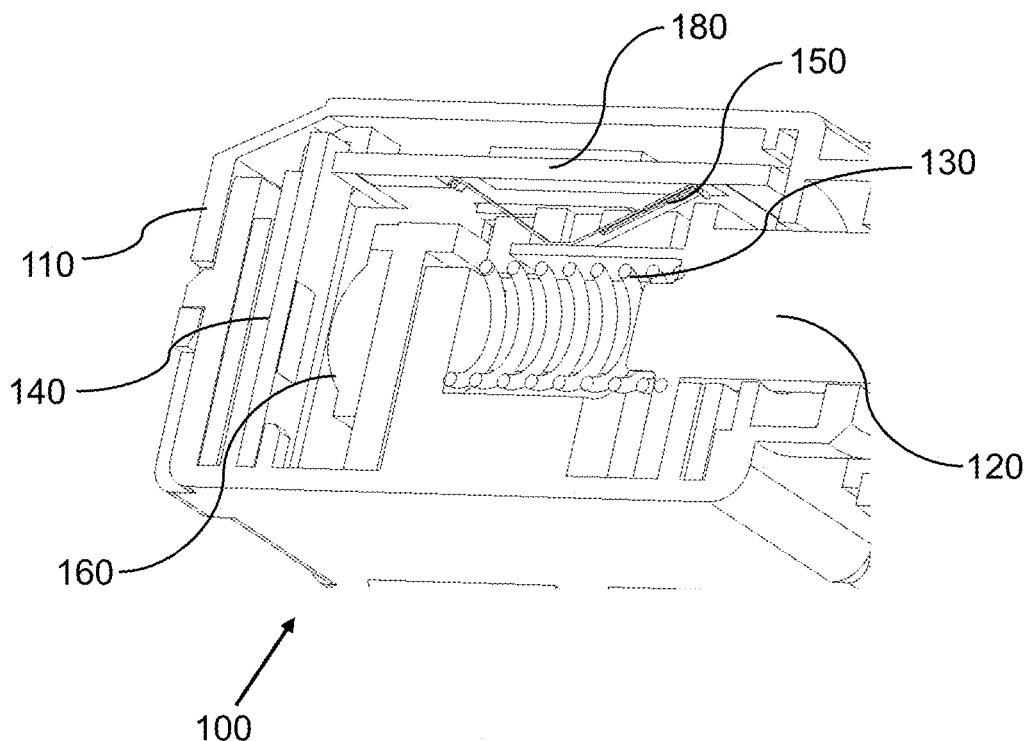
FIG. 4 shows a side cut-away view of the variable speed control assembly housing for use with an electric power tool in accordance with an embodiment of the present invention, wherein a conductive wiper of a second switch circuit can be seen rigidly mounted to a side of the trigger actuator such that when the trigger actuator is slidably moved in to its ON position, the conductive wiper closes the second switch circuit to supply current to the PCB.

Preferred embodiments of the present invention will now be described herein with reference to FIGS. 1 to 4. The embodiments comprise a variable-speed control assembly (100) for use with an electric power tool having an electric motor including for instance an electric drill, grinder, sander, saw, rotary driving tool and the like. It would be appreciated and understood that whilst this embodiment is described for use with an electric power tool, this is merely for purposes of illustrating functionality and alternate embodiments of the present invention may of course be used with other types of electrical devices such as electric gardening tools. Furthermore, whilst embodiments of the present invention described herein refer to electric devices comprising an electric motor, it would be appreciated that alternate embodiments of the present invention may also be applicable to electric devices which comprise a solenoid type electro-mechanical unit to effect operable movement (e.g. reciprocal motion) of the electric device.

The variable-speed control assembly (100) includes a moulded plastic housing (110) that is mounted to a body of the electric power tool near to a handle of the electric power tool. The housing (110) may typically include a first housing member and a second housing member that may be snap-fitted or screwed together to substantially enclose at least some of the components of the control assembly (100) therein. The control assembly (100) is operably-connected with a trigger assembly comprising a trigger actuator (120) configured for slidable linear movement inwardly and outwardly of the housing (110) via an opening in the housing (110) along a movement axis (X-X') between an OFF position and an ON position. The trigger actuator (120) is finger-operable at one end (external of the housing) to effect the slidable movement whereby the trigger actuator (120) is configured for operable-interaction with a first switch circuit (170) located within the housing (110). When the trigger actuator (120) is slidably arranged in to its OFF position (i.e. when extended relatively outwardly of the housing opening) it is configured to urge the first switch circuit in to an opened configuration which prevents flow of electrical current from a power supply to the electric motor via the first switch circuit. When the trigger actuator (120) is slidably arranged in to its ON position (i.e. when slid relatively inwardly of the housing opening) it is configured to urge the first switch circuit in to a closed configuration which enables flow of electrical current from the power supply to the electric motor via the first switch circuit. The trigger actuator is biased in to the OFF position by a return spring (130) that is operably-connected between the trigger actuator (120) and an internal surface of the housing (110).

The control assembly further includes a speed-signaling circuit module (140) comprising a printed circuit board (PCB) (140) mounted to an internal surface of the housing (110). The PCB (140) includes signaling circuitry configured for electrical connection with the power supply via a second switch circuit (180) so that an electrical current may selectably pass through the PCB (140) of the signaling circuitry when the second switch is in a closed or ON state. In this embodiment, the second switch circuit includes a conductive wiper (150) rigidly mounted on the trigger actuator (120) such that when the trigger actuator (120) has been moved slidably inwardly of the housing a requisite distance (e.g. a distance of 2 mm from inwardly of the housing (110) from the OFF position towards the ON position in this embodiment), the conductive wiper (150) is moved in to a position whereby it electrically closes the second switch circuit and thereby allow current to flow to the PCB (140) from the power supply. Conveniently, the operation of the second switch circuit allows the PCB (140) to be deactivated when the trigger actuator (120) is arranged OFF and to only power up when the trigger actuator (120) is arranged ON, thus conserving energy usage in the electrical device. The PCB (140) includes a pair of spaced-apart electrically-conductive stationary contact members (140A, 140B) disposed on a surface of the PCB. In this embodiment, the stationary contact members (140A, 140B) are provided by way of conductive carbon films mounted on the PCB (140) surface, however in alternate embodiments, the stationary contact members (140A, 140B) may take the form of silver nano-wires or any other suitable functionally equivalent element. A movable electrically-conductive contact member (160) is rigidly mounted on an end of the trigger actuator (120) inwardly of the housing (110) and is configured for movement relative to the pair of stationary contact members (140A, 140B) between as the trigger actuator (120) slidably moves between its OFF position and its ON position. In operation, when the trigger actuator (120) is arranged in its OFF position (e.g. in FIG. 1 when the trigger actuator is maximally extended outwardly of the housing opening), the first switch circuit is opened, and the movable contact member (160) mounted to the trigger actuator is positioned at a distance of approximately 2 mm apart from the pair of stationary contact members (140A, 140B) so that it does not form an electrical connection between the pair of stationary contact members (140A, 140B). When the finger-operable end of the trigger actuator has been squeezed by the user, and the trigger actuator (120) slides inwardly of the housing (110) a distance of 2 mm, the movement of the trigger actuator (120) urges the first switch circuit into a closed state so that current is able to be supplied to the electric motor from the power supply, and, the movable contact member (160) is moved in to contact with the pair of stationary contact members (140A, 140B) so as to form an electrical connection between the stationary contact members (140A, 140B). At this stage, as the second switch circuit has been closed by movement of the conductive wiper (150), and, an electric current is supplied to the PCB (140) from the power supply and is also able to flow between the stationary contact members (140A, 140B) via the movable contact member (160). This will be referred to as the first "ON" position of the movable contact member (160) relative to the pair of stationary contact members (140A, 140B). The movable contact member (160) is able to be moved further beyond the first ON position relative to the pair of stationary contact members (140A, 140B) into a plurality of further ON positions. When the movable contact member (160) is arranged in each of the plurality of further ON positions, the PCB (140) is configured for producing different output electrical signals corresponding to each of the plurality of ON positions for use in controlling operation of the electric motor at different speeds as will be explained further below. As the trigger actuator (120) is squeezed further inwardly of the housing from 2 mm inward of the housing (110) to approximately 3 mm inward of the housing (i.e. a range of 1 mm), the movable contact member (160) will electrically connect the pair of stationary contact members (140A, 140B) in the plurality of further ON positions. In this regard, the movable contact member includes an electrically-conductive elastically-deformable material such as conductive silicone or conductive foam, whereby as the trigger actuator (120) is squeezed further inwardly of the housing (110) this further 1 mm distance inward of the housing, the movable contact member (160) will deform in to a plurality of different deformed configurations each of which form an electrical connection between the pair of stationary contact members (140A, 140B) when arranged in each of the plurality of ON positions. Further, when the movable contact member (160) is arranged in each of the plurality of ON positions, a contact area between the movable contact member (160) and the pair of stationary contact members (140A, 140B) will vary in each of the plurality of ON positions resulting in an amount of electrical resistance across the movable contact member (160) varying. The variation in the contact area between the movable contact member (160) and the pair of stationary contact members (140A, 140B) results from compression of the elastically-deformable material along the movement axis (X-X') and lateral spreading out of the elastically-deformable material along the surfaces of the stationary contact members (140A, 140B) on the PCB (140). As the trigger actuator (120) moves gradually through the 1 mm range, the compression and lateral spread of the elastically-deformable material increases so as to reduce the overall electrical resistance between the pair of stationary contact members (140A, 140B) when an electrical current flows through between the pair of stationary contact members (140A, 140B) via the movable contact member (160). The speed signaling circuit module (140) further includes a capacitor integrally formed in an integrated circuit configured for controlling the charging and discharging of the capacitor via the electrical resistance provided by the movable contact member (160). Accordingly, the speed signaling circuit module is configured for producing different output electrical signals for use in controlling speed of operation of the electric motor by reference to the charging and/or discharging time of the capacitor which will vary with the changing resistance across the movable contact member arranged in each of the plurality of ON positions. For instance, in these embodiments, by reference to the charging and discharging of the capacitor across the variable resistance, the integrated circuit acting as a timing signal generator could be used to effect high speed switching of MOSFETs driving stator windings of the electric motor so as to achieve different speed and torque by the electric motor corresponding to each of the plurality of ON positions.

It will become apparent from the disclosure that embodiments of the present invention may assist providing one or more of the following advantages over the existing art:
  (i) the range of threshold forces required to be applied by the user's finger to trigger variable speed operation of the motor may be calibrated to accommodate a range of lower threshold forces compared to operation of certain conventional trigger assemblies. Accordingly, this may be better suited for use by user's having relatively weak finger strength;
  (ii) embodiments of the present invention utilise fewer moving parts than compared to certain conventional trigger assemblies, and this may alleviate incidence of wear and damage to the trigger control assembly and costs involved in repairing/maintaining the trigger control assembly;
  (iii) embodiments of the present invention utilise a novel mechanism for varying speed of the operation of the electric motor by movement of a trigger actuator along a relatively small travel distance (e.g. less than 1 mm) to produce a suitably accurate range of variable speed signals to effect variable speed control of the electric motor. In comparison, the range of movement of a conventional trigger actuator in certain conventional trigger assemblies is typically at least within 4 mm-10 mm. Accordingly, embodiments of the present invention provide for a relatively compact and lightweight trigger control assembly which may conveniently reduce the overall size and weight of the electric device for improved storage, portability and hand-feel. Furthermore, embodiments of the present invention may provide for more economical utilisation of space within the housing so as to accommodate for higher load capacity components, wiring and heat dissipation elements. Furthermore, the relatively small travel distance of the actuator, being approximately no more than 3 mm in certain embodiments, means that a shorter actuator may be used for triggering and changes in the speed of the motor may be controlled more responsively due to the shorter travel distance required of the trigger actuator during triggering.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. A variable-speed control assembly for use in controlling speed of an electric motor of an electric device, the variable-speed control assembly including:
    a housing;
    a speed signaling circuit module located within the housing including a pair of spaced-apart electrically-conductive stationary contact members and a movable electrically-conductive contact member configured for movement relative to the pair of stationary contact members between at least one of an OFF position in which the movable contact member does not electrically connect the pair of stationary contact members, and, a plurality of ON positions in which the movable contact member electrically connects the pair of stationary contact members such that an electric current supplied to the speed signaling circuit module from a power supply of the electric device is able to flow between the pair of stationary contact members via the movable contact member;
    wherein the movable contact member includes an elastically-deformable material configured for deforming in to a plurality of different deformed configurations when arranged in each of the plurality of ON positions such that a contact area between the movable contact member and the pair of stationary contact members will vary in each of the plurality of ON positions resulting in an amount of electrical resistance across the movable contact member varying when arranged in each of the plurality of ON positions relative to the pair of stationary contact members;
    and whereby said speed signaling circuit module is configured for producing different output electrical signals configured for use in controlling speed of operation of the electric motor by reference to the variable electrical resistance across the movable contact member when arranged in each of the ON positions,
    and wherein the elastically-deformable material of the movable contact member is configured to compress within a range of approximately 1 mm as the movable contact member is movably arranged amongst the plurality of ON positions relative to the pair of stationary contact members.

2. A variable-speed control assembly as claimed in claim 1 wherein the speed signaling circuit module includes a printed circuit board and said pair of stationary contact members are integrally formed in the printed circuit board.

3. A variable-speed control assembly as claimed in claim 1 wherein at least one of the stationary contact members includes at least one of a conductive pad and a conductive wire disposed on a surface of the speed signaling circuit module.

4. A variable-speed control assembly as claimed in claim 1 wherein at least one of the pair of stationary contacts includes a carbon film.

5. A variable-speed control assembly as claimed in claim 1 wherein the conductive wire includes a silver nano wire.

6. A variable-speed control assembly as claimed in claim 1 wherein the elastically-deformable material of the movable contact member includes at least one of a conductive silicone material and a conductive foam material.

7. A variable-speed control assembly as claimed in claim 1 wherein the elastically-deformable material of the movable contact member is arranged a maximum distance of approximately 2 mm from the pair of stationary contact members when arranged in the OFF position.

8. A variable-speed control assembly as claimed in claim 1 wherein the speed signaling circuit module includes a capacitor and an integrated circuit configured for controlling the charging and discharging of the capacitor via the electrical resistance provided by the movable contact member and whereby said speed signaling circuit module is configured for producing different output electrical signals configured for use in controlling speed of operation of the electric motor by reference to the charging and/or discharging time of the capacitor.

9. A variable-speed control assembly as claimed in claim 1 including a trigger assembly including:
    a trigger actuator configured for operable-interaction with a first switch circuit, wherein said trigger actuator is configured for movement along a trigger actuator movement axis relative to the housing between at least one of an OFF position in which it causes the first switch circuit to open and prevent flow of electrical current from a power supply to the electric motor via the first switch circuit, and, an ON position in which it causes the first switch circuit to close and enable flow of electrical current from the power supply to the electric motor via the first switch circuit; and
    wherein said movable contact member of the speed signaling circuit module is operably-connected with the trigger actuator and movable by the trigger actuator between the OFF position relative to the pair of stationary contact members when the trigger actuator is arranged in its OFF position, and the plurality of ON positions relative to the pair of stationary contact members when the trigger actuator is arranged in its ON position.

10. A variable-speed control assembly as claimed in claim 1 including a second switch circuit having at least one stationary contact member located within the housing and a movable contact member configured for movement relative to the at least one stationary contact member between ON and OFF operational positions, wherein when arranged in the OFF operational position the second switch circuit is configured to restrict electrical current from being supplied to the speed signaling circuit module from the power supply, and wherein, when arranged in the ON operational position the second switch circuit is configured to allow electrical current to flow to the speed signaling circuit module from the power supply, and whereby said second switch circuit is configured for being arranged in the OFF operational position when the trigger actuator is arranged in its OFF position.

11. A variable-speed control assembly as claimed in claim 10 wherein the movable contact member of the second switch circuit includes a conductive wiper rigidly-mounted on the trigger actuator.

* * * * *